Figure 1:
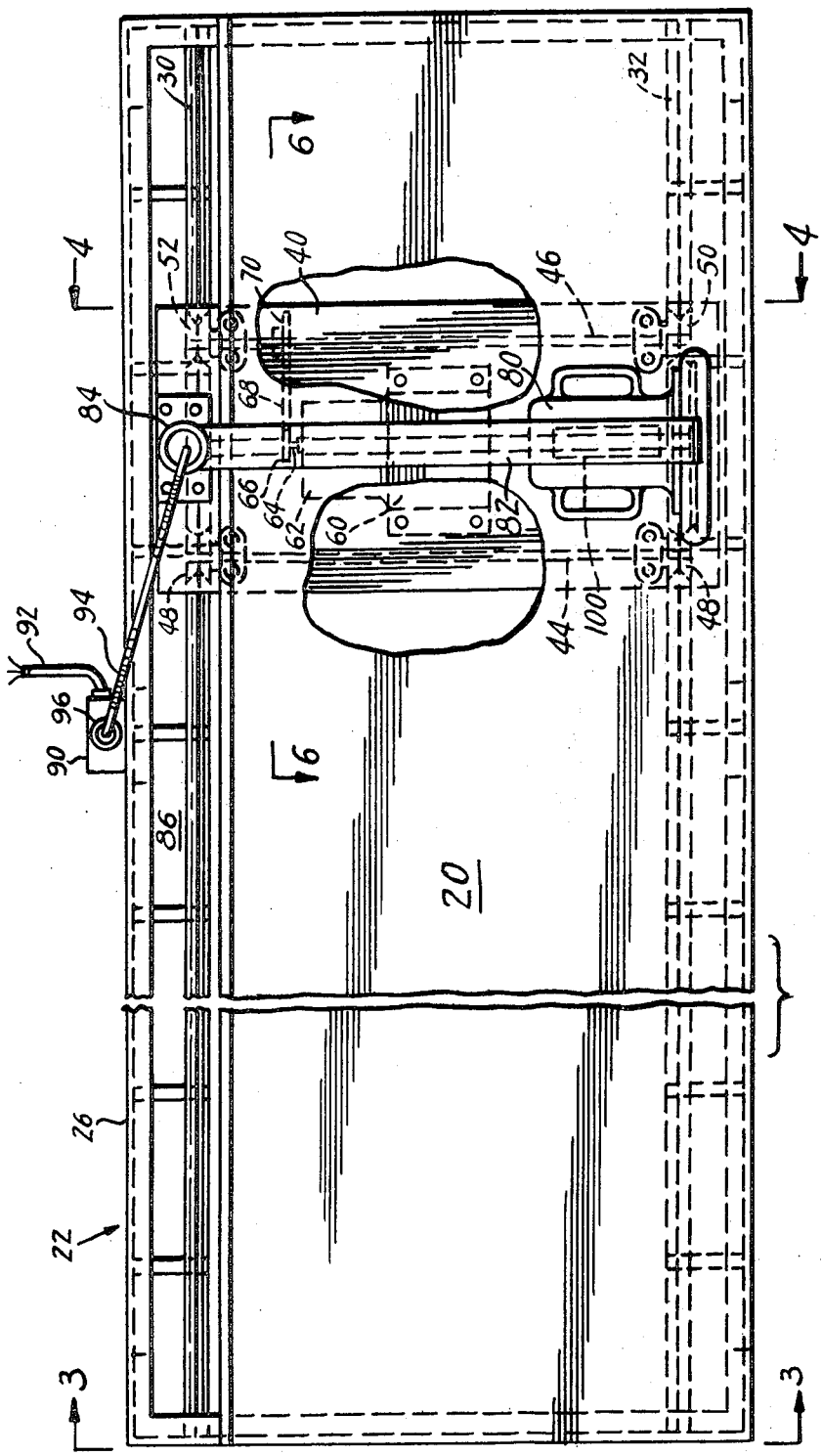

United States Patent

Baldwin et al.

[11] 3,707,997
[45] Jan. 2, 1973

[54] SAW CARRIAGE APPARATUS

[76] Inventors: Jewell S. Baldwin; Hazel Baldwin, both of P.O. Box 183, Lexington, Mo. 64067

[22] Filed: March 23, 1971

[21] Appl. No.: 127,248

[52] U.S. Cl. ................................ 83/483, 83/388
[51] Int. Cl. ............................................ B27b 5/18
[58] Field of Search........143/47 R, 47 D, 47 E, 47 F, 143/6 R, 6 A, 6 J; 83/388, 389

[56] References Cited

UNITED STATES PATENTS

| 2,719,551 | 10/1955 | Baldwin et al. | 143/47 F |
| 1,856,476 | 5/1932 | Gardner | 143/47 D |
| 2,870,802 | 1/1959 | Richards | 143/47 D |
| 3,600,833 | 8/1971 | Hartzell | 143/47 D X |

Primary Examiner—Donald R. Schran
Attorney—Victor J. Evans & Co.

[57] ABSTRACT

A raised platform with longitudinal rails, a wheeled carriage mounted on the rails, and motors mounted to the carriage for moving the carriage relative to the rails and for actuating a saw blade above the carriage.

2 Claims, 6 Drawing Figures

INVENTORS.
JEWELL S. BALDWIN
HAZEL BALDWIN
BY
Victor J. Evans &co.
ATTORNEYS.

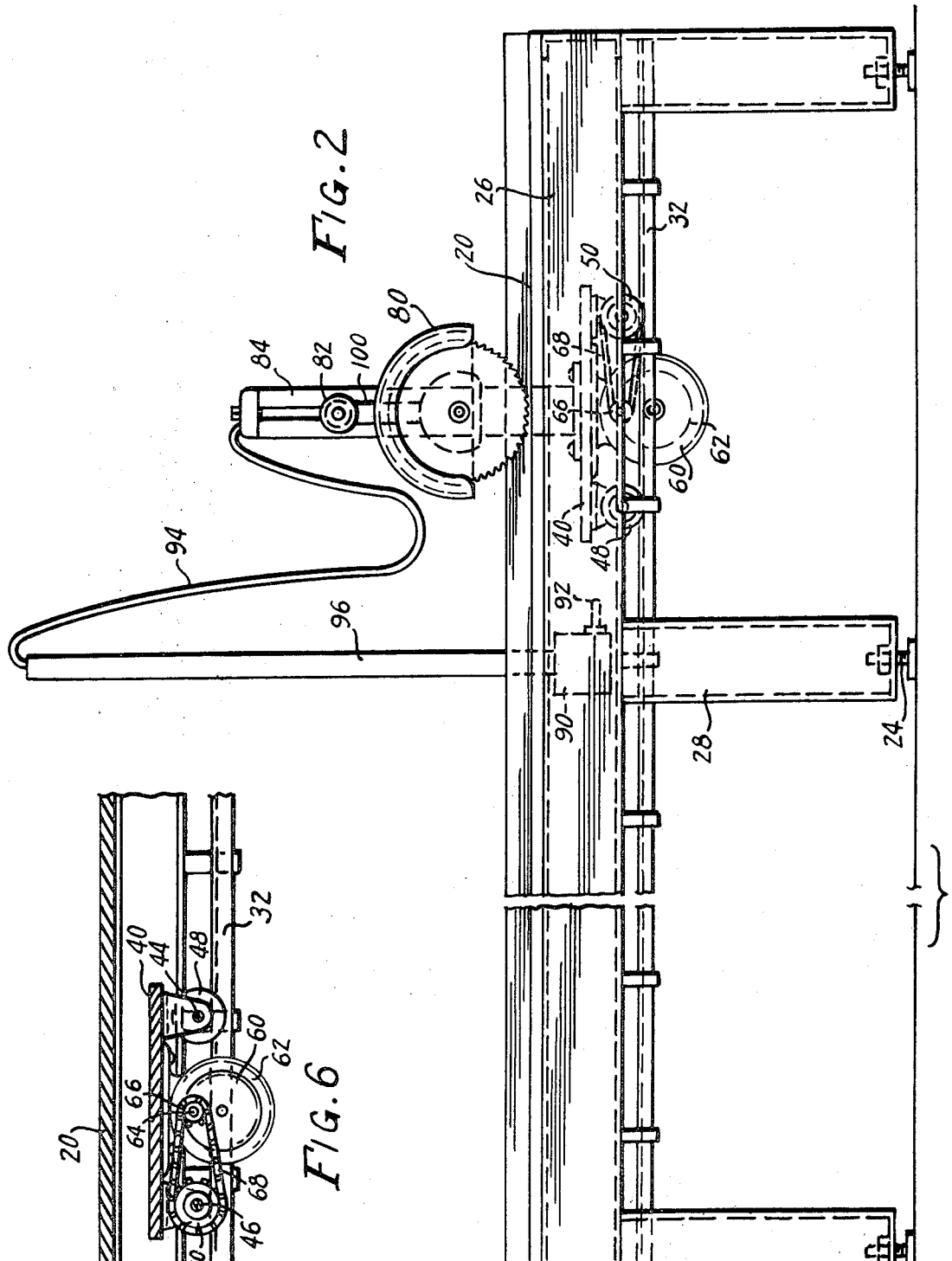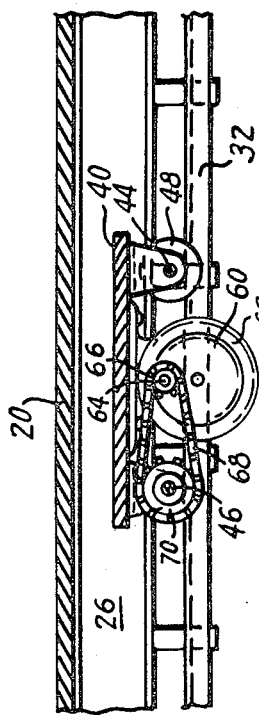

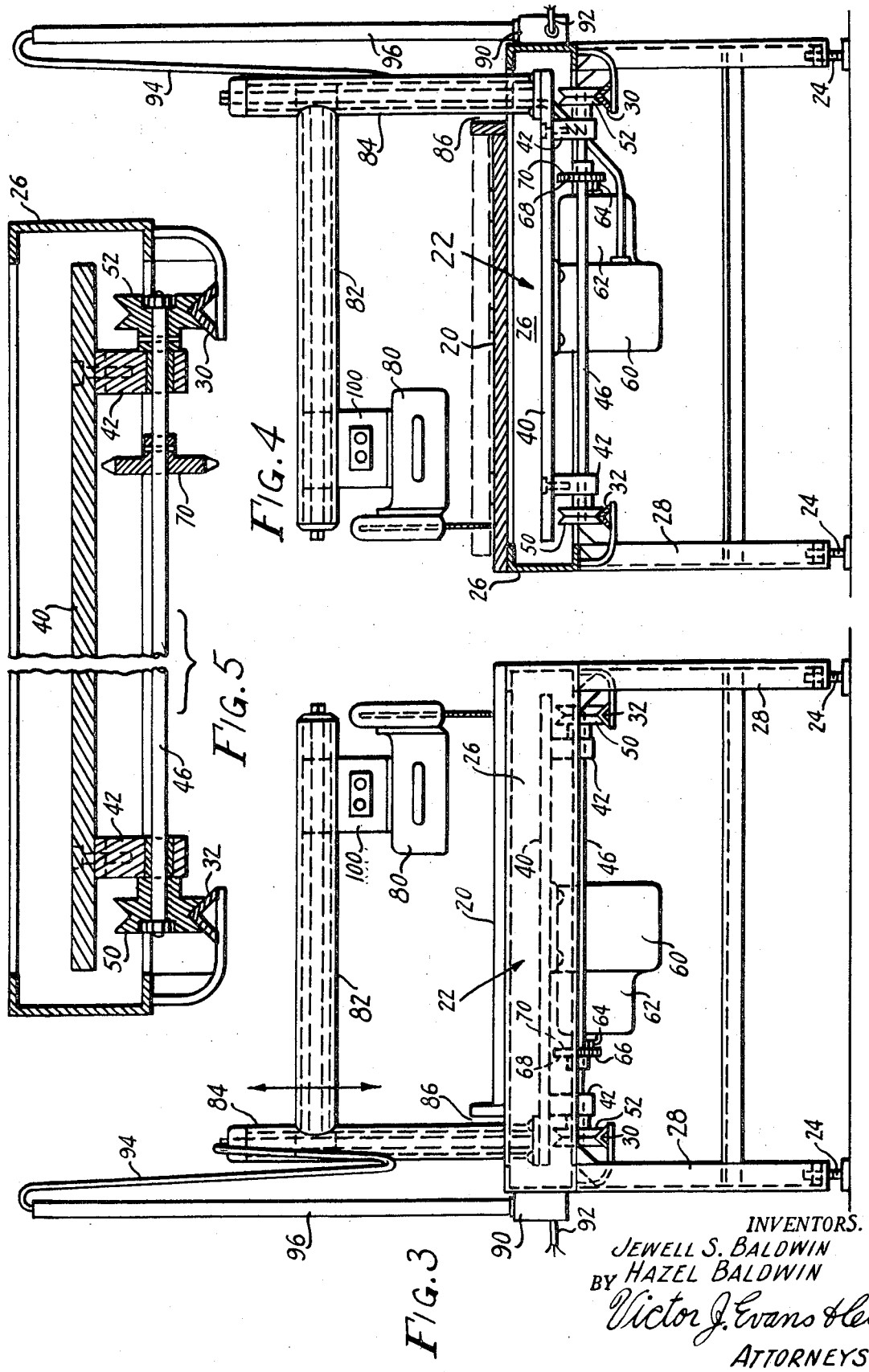

SAW CARRIAGE APPARATUS

This invention relates to lumber cutting saws of the type generally referred to as table saws, and in particular a table saw having an elongated table and a radial arm saw mounted on a carriage whereby the saw is adapted to travel longitudinally of the table and is also adapted to cut at different angles, being mounted to be adjusted to different positions relative to the saw table. With the conventional type of table saw, the bed or table is comparatively short and it is difficult to hold long pieces of lumber such as floor and ceiling joists and roof rafters, and where saws are provided to travel longitudinally of a table frame, it is difficult to swing the saws to make cuts at different angles. More specifically, saws that have been built movable along long distances have caused several problems. For instance, in the applicants' prior patent, U.S. Pat. No. 2,719,551, issued Oct. 4, 1955, the slack in the length of chain caused a slight surge which produced uneven movement of the saw. Also, the apparatus of this patent would not obviate nor eliminate the situation where the saw would bind when cutting through hard material and therefore cause an overload on the motor.

Accordingly, a primary object of this invention is a simple, inexpensive, and efficient table saw for long pieces of lumber.

Another object of this invention is the elimination of uneven movement in saws of prior art apparatus.

A further object of this invention is the provision of apparatus for smoother cutting through the elimination of saw binding and overloading the motor.

The above and other objects of this invention will become apparent to those skilled in the art after a consideration of a detailed description of a preferred embodiment of this invention taken together with the accompanying drawings wherein:

FIG. 1 is a plan view of the table saw;
FIG. 2 is a side elevational view thereof;
FIG. 3 is a sectional view taken on line 3—3 of FIG. 1;
FIG. 4 is a sectional view taken on line 4—4 of FIG. 1;
FIG. 5 is a blown up cross-sectional view of the roller apparatus; and
FIG. 6 is a sectional view taken on line 6—6 of FIG. 1.

Referring in detail to the drawing, there is shown a table top 20 mounted on a frame 22 resting on adjusting screws 24. Frame 22 is comprised of horizontal channels 26 supporting table 20 and angle iron legs 28 supporting channels 26. Secured to the top of legs 28 and adjacent the bottom surfaces of channels 26 are longitudinal V-shaped rails 30 and 32 extending inward beneath table 20 and parallel with the side channels 26 and the side of table 20.

A carriage 40 is mounted on two pairs of bearings on shafts 44 and 46. Shaft 44 is secured at the ends thereof to wheels 48 which are rollably mounted on rails 30 and 32. Shaft 46 is slidably secured to a free wheeling wheel 50 on one end thereof rollable on rail 32 and is fixedly secured and locked to a wheel 52 on the other end thereof rollable on rail 30. Mounted below carriage 40 is a motor 60 with a gear reduction 62 extending therefrom for rotating a shaft 64 with a sprocket 66 thereon. A chain 68 on sprocket 66 and a sprocket 70 fixedly secured on shaft 46 drives shaft 46 and wheel 52 for movement along the length of table 20 on rails 30 and 32. Mounted above table 20 is an adjustable power saw 80 extending below an arm 82 extending from a post 84 which is mounted on top of carriage 40 for movement within a longitudinal space 86 between table top 20 and one of the side channels 26.

A junction box 90 mounted on one of channels 26 is connected by means of a cable 92 to a power source. A cable 94 leading from junction box 90 up through a longitudinal conduit 96 above post 84 drops down into post 84 and is connected to power saw 80 and motor 60. The switch box 100 is conveniently located below arm 82 above table 20 and comprises a two-way reversible switch for motor 60, a two-speed switch for motor 60, and a switch for power saw 80. Due to the short length of chain 68, there is no more slack nor uneven movement along table 20. Also, the weight of motor 60 and power saw 80 with the rest of the apparatus mounted to carriage 40 is such as to permit wheel 52 to slip on rail 30 when overloaded so that the saw is not damaged nor overloaded when encountering hard material and binding.

It should be understood by those skilled in the art that while a preferred embodiment has been illustrated and described, many changes and modifications may be resorted to without departing from the spirit and scope of the invention. For instance, motor 60 could be controlled from a switch box located at any other convenient point.

I claim:

1. A saw apparatus comprising a frame, a work support table secured to said frame, a pair of spaced apart parallel generally horizontal rails secured to said frame below said table, a carriage, a pair of generally horizontal shafts supporting said carriage and extending transversely of said rails, a wheel mounted on each end of each of said shafts and engaging said rails for rolling movement therealong, a transverse horizontally adjustable electric saw mounted on said carriage and extending over said table, an electric drive motor for said carriage secured beneath said carriage and means connecting said motor to a single one of said wheels for normally moving said carriage along said rails, said driven single one of said wheels slipping on said rail when said electric saw meets unusual resistance.

2. A device as claimed in claim 1 including means on said frame for flexibly and detachably connecting said electric saw and said motor to a source of electricity.

* * * * *